US005637035A

United States Patent [19]
Yee

[11] Patent Number: 5,637,035
[45] Date of Patent: Jun. 10, 1997

[54] ADJUSTABLE GUARD ARRANGEMENT FOR POWER TOOL

[75] Inventor: Chungkin Yee, Kenosha, Wis.

[73] Assignee: Milwaukee Electric Tool Corporation, Brookfield, Wis.

[21] Appl. No.: 496,249

[22] Filed: Jun. 28, 1995

[51] Int. Cl.$^6$ .............. B23D 47/00; B24B 7/18; B24B 55/04
[52] U.S. Cl. .......... 451/358; 30/391; 144/251.2; 451/452; 451/455
[58] Field of Search .............. 30/390, 391; 83/544; 144/251.2, 251.3; 451/344, 358, 359, 451, 452, 454, 455

[56] References Cited

U.S. PATENT DOCUMENTS

| | | | |
|---|---|---|---|
| 4,059,930 | 11/1977 | Alessio | 451/451 |
| 4,343,115 | 8/1982 | Stabler et al. | 451/451 |
| 4,577,526 | 3/1986 | Stabler | 74/609 |
| 4,924,635 | 5/1990 | Rudolf et al. | 451/451 X |
| 5,005,321 | 4/1991 | W. Barth et al. | 451/451 X |
| 5,031,325 | 7/1991 | Walter et al. | 451/451 X |
| 5,384,985 | 1/1995 | Jacobsson | 451/451 X |
| 5,386,667 | 2/1995 | Hausslein et al. | 451/344 |

FOREIGN PATENT DOCUMENTS

| | | |
|---|---|---|
| 0 126 641A2 | 5/1984 | European Pat. Off. . |
| 215476 | 3/1987 | European Pat. Off. ........ 451/451 |
| 0 599 090A1 | 11/1993 | European Pat. Off. . |
| 3919649 | 12/1990 | Germany . |
| 3940584 | 6/1991 | Germany . |
| 4113641 | 10/1992 | Germany . |
| 0575762 | 3/1944 | United Kingdom . |
| 92/19423 | 11/1992 | WIPO . |

Primary Examiner—Timothy V. Eley
Attorney, Agent, or Firm—Michael, Best & Friedrich

[57] ABSTRACT

The invention provides a guard arrangement including a guard member having an annular base provided with axially spaced apart first and second sets of radially inwardly extending and circumferentially spaced apart projections. The first and second sets of projections are circumferentially aligned and are alignable with axially extending grooves on a tool housing so that the guard member can be slid or snapped on and off the tool housing. To lock the guard member against removal from the tool housing, the tool housing is provided with a pair of annular grooves for receiving the projections on the guard member when the guard member is angularly shifted from a mounting position. To lock the guard member in a desired angular position, the guard member is provided with a finger-operated locking member that is engageable with detents located on the tool housing.

16 Claims, 4 Drawing Sheets

ADJUSTABLE GUARD ARRANGEMENT FOR POWER TOOL

BACKGROUND OF THE INVENTION

1. Field of the Invention

The invention relates generally to guard arrangements for hand-held power tools, and more particularly to removable and adjustable guard arrangements.

2. Reference to Prior Art

Portable power tools having rotating tool heads are commonly provided with guards for protecting tool users from debris. Such guards are especially useful in grinding/sanding power tools such as angle grinders having spindles on which work wheels, e.g. grinding wheels, sanding wheels and the like, are mounted.

It is known to mount a guard on a power tool, such as a grinder, by securing the guard on the grinder housing with fasteners. It is also known to provide a guard with a clamping ring for mounting the guard on the neck or spindle hub of a grinder. The clamping ring is secured in place by tightening a screw clamp portion of the clamping ring. Examples of guard arrangements including clamping rings are provided in published German Application Nos. DE 39 19 649 A1 and DE 39 40 584 A1. In the foregoing guard arrangements considerable time and effort are expended by a tool operator to remove or reposition the guard, and tools such as screwdrivers are required to accomplish at least the removal of the guard from the tool.

An example of a guard arrangement that is mountable on the housing of an angle grinder without the use of tools is illustrated in U.S. Pat. No. 4,059,930. In that arrangement a spring-loaded pin is deflected by installation of the guard and serves to prevent removal of the guard once it is mounted on the tool housing. However, to remove the guard the pin must first be depressed using a tool.

SUMMARY OF THE INVENTION

The invention provides an improved guard arrangement for a power tool, such as an angle grinder, for example. The improved guard arrangement combines light weight and durability in a compact, inexpensive construction and is designed so that if guardless power tool operation is desired no part of the guard arrangement is substantially exposed to the tool attachment or debris generated thereby. The improved guard arrangement is also entirely manually operable and includes a guard member that can be quickly and easily removed from or replaced on a power tool without the need for tools, such as screwdrivers and pliers for example. The guard member can also be quickly repositioned without the use of tools.

In one embodiment the improved guard arrangement includes a mounting system for conveniently mounting and dismounting the guard member. The mounting system is designed so that the guard member can be slid or snapped on or off the power tool when it is positioned in a predetermined installing or mounting position relative to the power tool. In that position the guard member is generally inoperable. The guard arrangement also includes a retention system for holding or locking the guard member on the tool once mounted thereon. To engage the retention system, the guard member is shifted from its non-operable mounting position. To disengage the retention system to allow removal of the guard member, the guard member is shifted back to its mounting position. The guard arrangement also includes a locking system for locking the guard member in a selected position within a range of operating positions. The locking system includes a manually operable locking member that is finger operable to selectively lock the guard member in the desired position and unlock the guard member.

More particularly, the invention provides a guard arrangement including a guard member having an annular base that is provided with a plurality of radially inwardly extending and circumferentially spaced apart projections. The projections are alignable with axially extending grooves on the tool housing and, when the projections and the grooves are aligned, the guard member can be slid or snapped on and off the tool housing. To lock the guard member against removal from the tool housing, the tool housing is provided with an annular groove for receiving the projections on the base of the guard member. When the guard member is angularly shifted the projections are removed from registry with the axially extending grooves and brought into the annular groove. The projections and the annular groove then prevent removal of the guard member.

The guard member has a range of operable positions which are defined by detents located on the tool housing. To lock the guard member in a desired one of the operative positions, the guard member is provided with a spring locking member that is engageable with a selected one of the detents to lock the guard member in the corresponding position. Unlike prior art arrangements, the locking member is fixed in position on the guard member and moves therewith so that when the guard member is removed from the tool housing the locking member is also removed therefrom. This permits the locking member to be removed from the tool housing so that the guard arrangement is not significantly exposed to the tool attachment or debris in the event power tool operation without the guard member is desired.

The invention also provides a power tool including a housing having a plurality of detents, a drive spindle extending outwardly from the housing, and a removable guard member. The guard member is mountable on the housing to cover at least a portion of a tool attachment mounted on a tool receiving portion of the drive spindle, and the guard member is angularly adjustable over a range of positions with respect to the housing. The power tool also includes a manually operable locking member mounted on the guard member so that when the guard member is removed from the housing the locking member is also removed therefrom. The locking member is engagable with the detents to lock the guard member in selected angular positions.

The invention further provides a power tool including a housing having a hub portion, a drive spindle extending outwardly from the hub portion, and a removable guard member mountable on the hub portion to cover at least a portion of a tool attachment mounted on the spindle. The guard member is adjustable over a range angular positions with respect to the hub portion. The power tool also includes means for securing the guard member on the hub portion so that the guard member is rotatable relative to the hub portion. The means for securing the guard member on the hub portion includes a pair of axially spaced apart annular grooves on the hub portion.

Other features and advantages of the invention will become apparent to those skilled in the art upon review of the following detailed description, claims and drawings.

Figure 1:
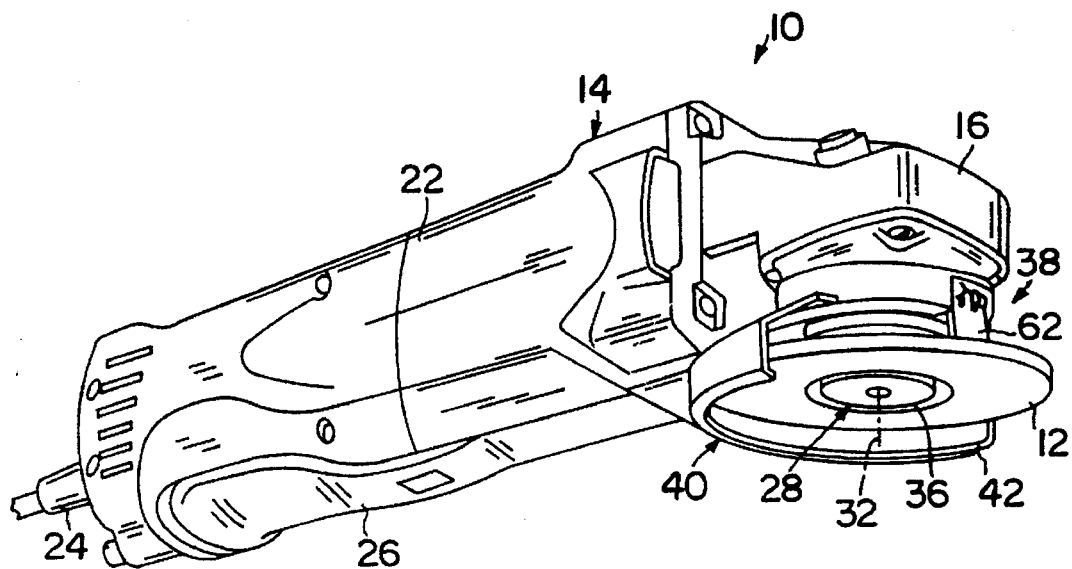
FIG. 1 is a perspective view of a power tool equipped with a guard arrangement embodying the invention.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF A PREFERRED EMBODIMENT

Illustrated in FIG. 1 is a power tool 10. In the particular embodiment illustrated in the drawings the power tool 10 is an angle grinder on which is mounted a removable work tool 12 such as an abrasive wheel.

The grinder 10 includes a housing 14 having a gear case 16. The gear case 16 includes a hub portion 18 having (FIGS. 3–7) an end face 20. The housing 14 also includes a motor housing portion 22 mounted on the gear case 16. A motor (not shown) is mounted in the motor housing portion 22 and an electric power supply cord 24 extends from the back of the motor housing portion 22 to power the motor. A paddle switch 26 for controlling power supply to the motor is mounted on the underside of the motor housing portion 22.

Figure 2:
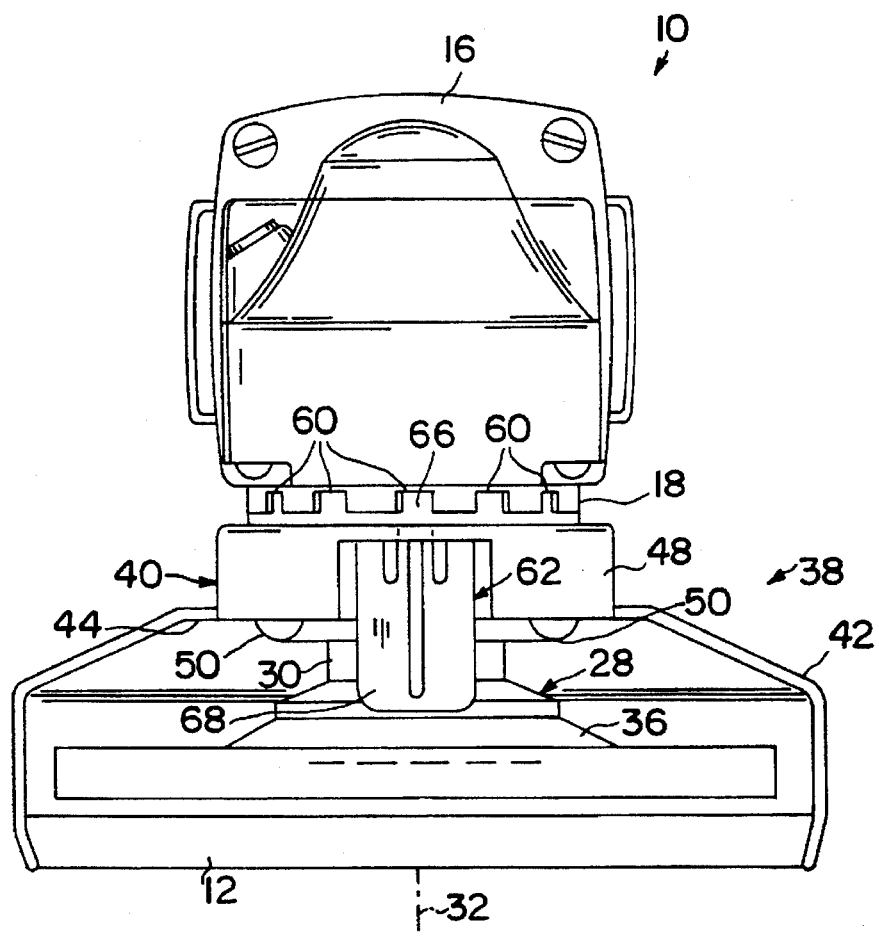
FIG. 2 is an enlarged front elevational view of the power tool illustrated in FIG. 1.
Figure 3:
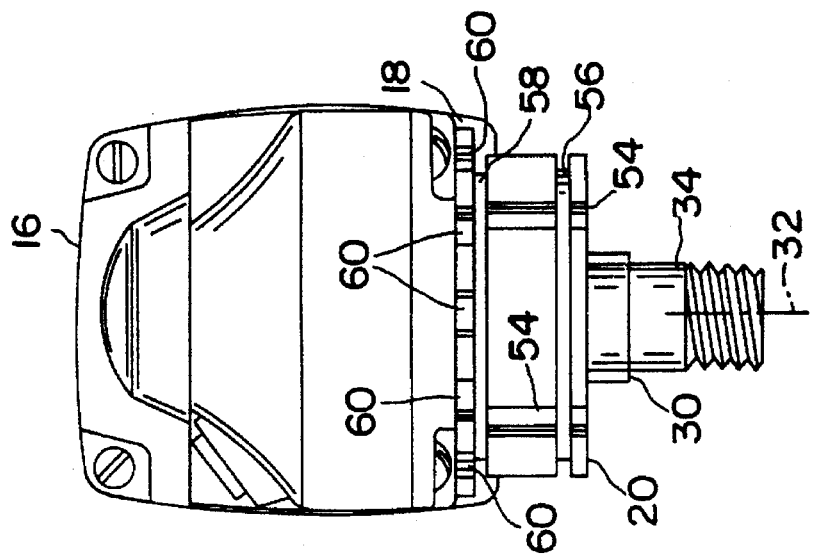
FIG. 3 is a front view of the power tool similar to FIG. 2 but with the guard member and the tool attachment removed from the power tool.

The grinder 10 also includes (FIGS. 1 and 2) a spindle assembly 28 that forms part of a drive train for driving the work tool 12 when the motor is activated. The spindle assembly 28 is supported by the gear case 16 and includes a spindle 30 that extends outwardly from the end face 20 of the hub portion 18. The spindle 30 has an axis of rotation 32 and a tool receiving portion 34 on which the work tool 12 is mountable. The spindle assembly 28 also includes a nut 36 that can be threaded onto the tool receiving portion 34 to secure the work tool 12 in place.

Figure 8:
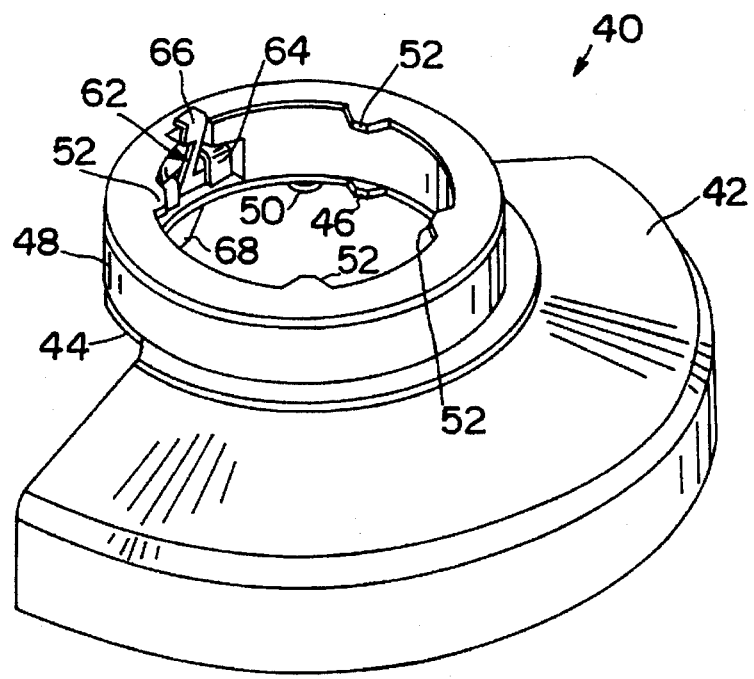
FIG. 8 is a perspective view of the guard member.

The grinder 10 also includes a guard arrangement 38 which embodies the invention. The guard arrangement 38 includes a removable guard member 40. As shown in FIG. 8, the guard member 40 includes a protective guard portion or hood member 42 that (see FIGS. 1 and 2) covers a portion of the work tool 12 when the guard member 40 is mounted on the housing 14. The hood member 42 is preferably a one-piece unit made of metallic material and includes an annular plate-like portion 44. For reasons more fully explained below, the plate-like portion 44 is provided with a set of radially-inwardly extending projections 46. In the illustrated arrangement that set includes (FIGS. 5 and 7) four projections 46 that are unequally circumferentially spaced apart.

The guard member 40 also includes an annual spacer member or base 48 that is preferably made of a non-metallic plastic material and that is secured in coaxial relation to the plate-like portion 44 by suitable means such as screws 50. The base 48 includes (FIG. 8) a second set of four radially-inwardly extending projections 52 that are spaced axially from the projections 46. Projections 52 are circumferentially spaced apart from each other to match the spacing pattern and align with projections 46.

The guard arrangement 38 also includes means for securing the guard member 40 on the housing 14 of the grinder 10. In a preferred embodiment the guard member 40 is securable on the hub portion 18 and includes means for installing or mounting the guard member 40 on the hub portion 18. In the particular arrangement illustrated in the drawings the mounting means includes the two sets of projections 46 and 52 and corresponding axially extending grooves 54 formed in the hub portion 18 and extending from the end face 20 thereof. The grooves 54 are circumferentially spaced to match the pattern of the projections 46 and 52 so that when the projections are aligned with the grooves 54 (FIG. 7) the guide member 40 can slide on and off the hub portion 18. Since the projections 46 and 52 and the grooves 54 are non-equidistantly circumferentially spaced apart the guard member 40 must be positioned in the predetermined angular position shown in FIG. 7 relative to the hub portion 18 in order for the guard member 40 to be placed on the hub portion 18. As explained below, the guard member 40 must also be placed in that position relative to the hub portion 18 for the guard member 40 to be removed therefrom.

Figure 4:
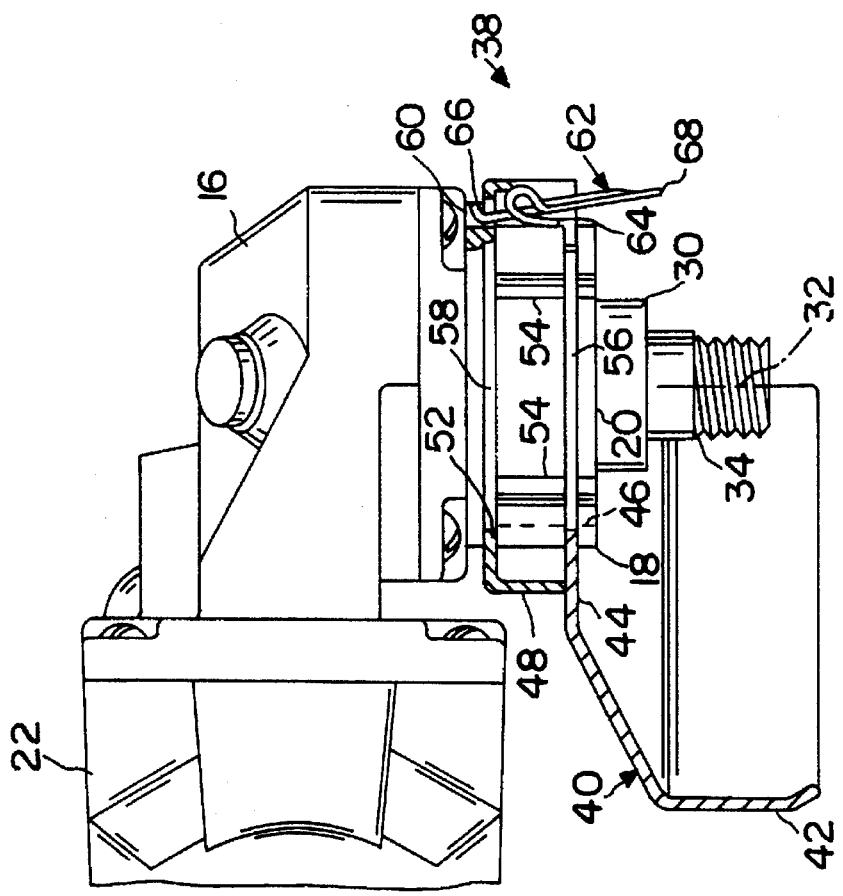
FIG. 4 is an enlarged side elevational view of the front portion of the power tool illustrated in FIG. 1 and shown with the guard member in section and the tool attachment removed.
Figure 5:
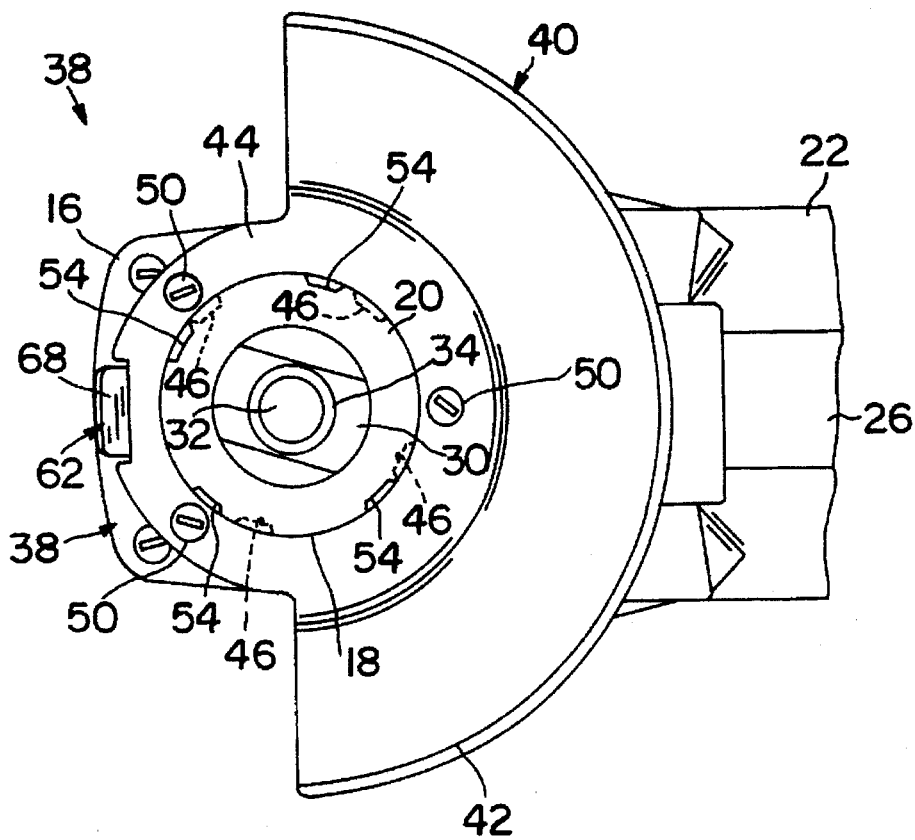
FIG. 5 is a bottom plan view of the front portion of the power tool illustrated in FIG. 4.
Figure 6:
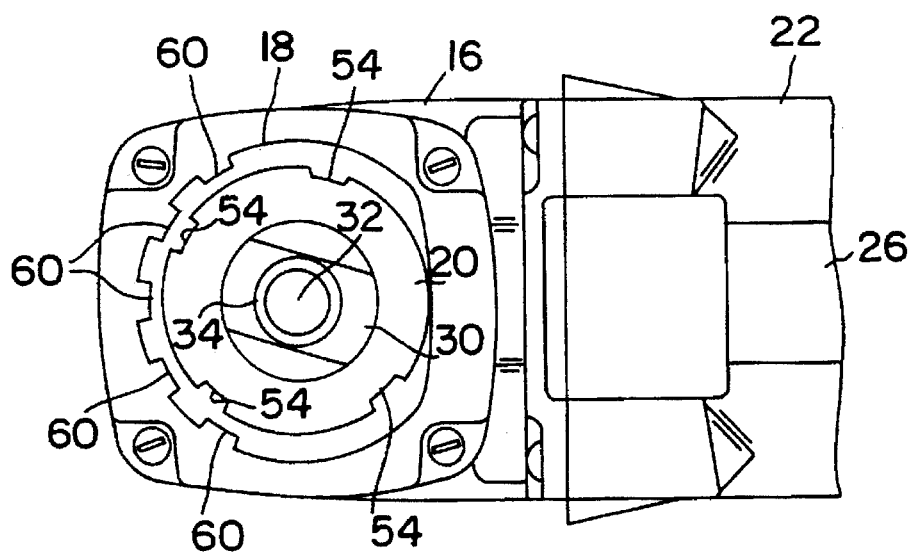
FIG. 6 is a view of the power tool similar to FIG. 5 but with the guard member also removed.
Figure 7:
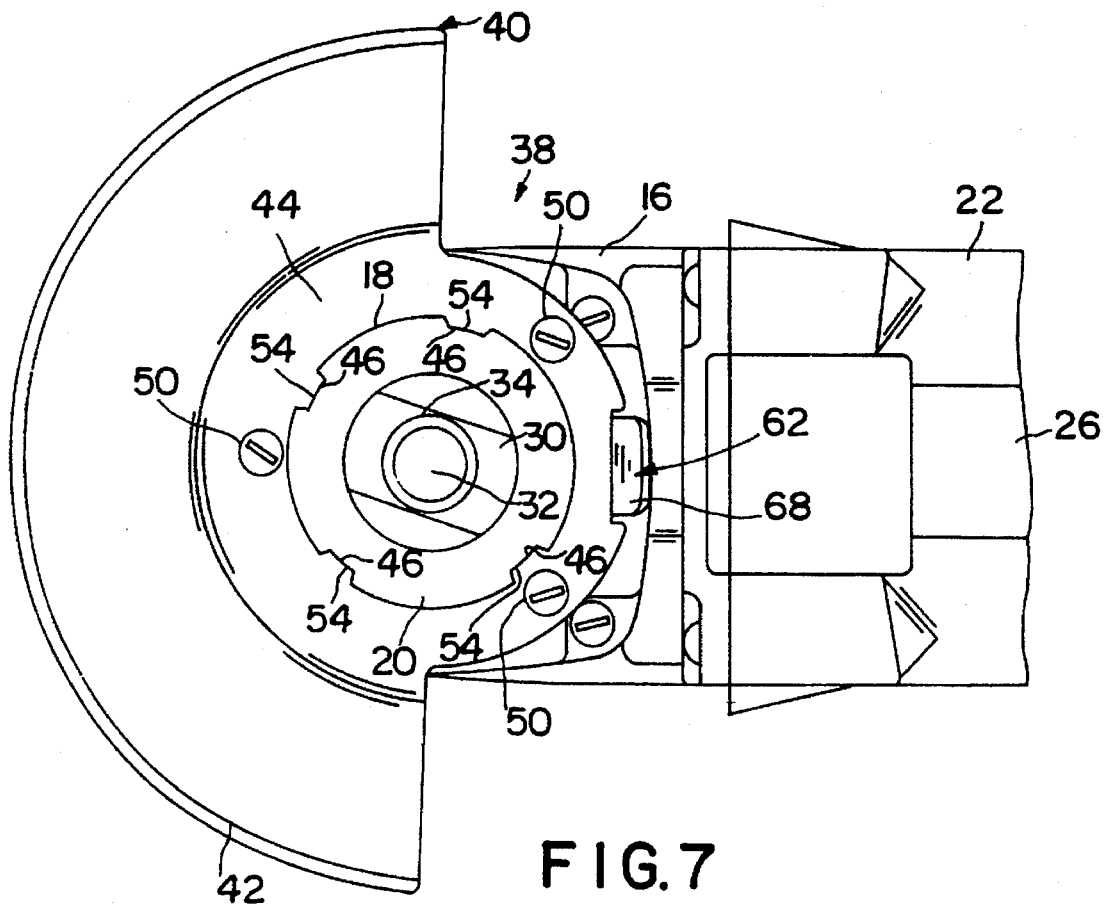
FIG. 7 is a view of the power tool similar to FIG. 5 but with the guard member shown in a mounting position.

The means for securing the guard member 40 on the housing 14 also includes means for holding or maintaining the guard member 40 on the housing 14 after it is placed thereon. In the embodiment illustrated in the drawings the holding means includes the projections 46 and 52 and (FIGS. 3 and 4) a pair of annular grooves 56 and 58 formed in the hub portion 18. The annular grooves 56 and 58 are spaced apart in an axial direction the same distance as the projections 46 and 52. When the guard member 40 is slid fully onto the hub portion 18, as shown in FIG. 4, the projections 46 and 52 register with the annular grooves 56 and 58, respectively. The guard member 40 is then rotated or shifted relative to the hub portion 18 to slide the projections 46 and 52 into the annular grooves 56 and 58 so that the projections 46 and 52 become misaligned (see FIG. 5) with respect to the axially extending grooves 54. That misalignment secures the guard member 40 on the hub portion 18.

While the use of a single annular groove and corresponding set of projections for holding the guard member 40 in place on the grinder 10 can be used, a pair of annular grooves 56 and 58 and two sets of projections 46 and 52 provide greater stability for the guard member 40 and are therefore preferred.

When the projections 46 and 52 are received in the annular grooves 56 and 58 the guard member 40 is rotatable relative to the hub portion 18 by 360 degrees. However, in the illustrated arrangement the guard member 40 has a desired range of acceptable angular positions. That range is defined by (FIGS. 2, 3 and 6) a series of notches or detents 60 formed in the hub portion 18 above the axially extending grooves 54. To secure or lock the guard member 40 in a selected one of the angular positions defined by the detents 60, the guard arrangement 38 is provided with locking means which in the illustrated arrangement includes a locking member or spring 62.

As shown in FIG. 8, the locking spring 62 is supported entirely on the guard member 40 so that when the guard member 40 is removed from the housing 14 the locking spring 62 is also removed therefrom. The locking spring 62 includes (FIG. 4 and 8) a plate section 64 that is fixed in position on the base 48. The locking spring 62 also includes a locking portion 66 and a manually operable lever arm 68. The locking portion 66 is engageable with the detents 60 to secure the guard member 40 in a corresponding angular position. To change the angular position of the guard member 40 the lever arm 68 is finger-operable and can be depressed to withdraw the locking portion 66 from a detent 60 and thereby permit angular shifting of the guard member 40.

In operation, the work tool 12 must be removed to install the guard member 40. To mount the guard member 40 on the housing 14 the projections 46 and 52 are aligned with the axially extending grooves 54 and the guard member 40 is then slid onto the hub portion 18 until the projections 46 and 52 register with the annular grooves 56 and 58, respectively. The guard member 40 is then angularly shiftable to a desired angular position, and once the projections 46 and 52 are misaligned with respect to the axially extending grooves 54 the guard member 40 is held in place on the hub portion 18. With the guard member 40 installed the work tool 12 can be mounted on the tool receiving portion 34 of the spindle 30 and secured thereon with the nut 36.

The guard member 40 can be shifted with the tool attachment 12 either removed or in place, and before operating the grinder 10 the guard member 40 is shifted to a desired angular position. During shifting it is desireable to depress the lever arm 68 so that the locking portion 66 does not interfere with rotational movement of the guard member 40. When the guard member 40 is shifted to its desired angular position the lever arm 68 is released to permit the locking portion 66 to engage the corresponding one of the detents 60 to thereby lock the guard member 40 in that position. The angular position of the guard member 40 can be changed by simply depressing the lever arm 68, repositioning the guard member 40, and then releasing the lever arm 68 to permit the locking portion 66 to engage the appropriate detent 60.

To remove the guard member 40 the tool attachment 12 is removed and the guard member 40 is rotated from its operative range to realign the projections 46 and 52 (FIG. 7) with the axially extending grooves 54. The guard member 40 is then slid off of the hub portion 18.

While in the illustrated arrangement the power tool is a grinder 10, it will be understood by one skilled in the art that a guard arrangement embodying the invention could be incorporated into a variety of power tools including both portable hand-held tools and other tools.

Advantageously, the guard arrangement 38 provides convenient systems for installing the guard member 40, adjusting the position of the guard member 40, and securing the guard member in place. The guard arrangement 38 combines those features in a compact design which incorporates a position locking member into the removable guard member 40 so that structure associated with the guard arrangement 38 is substantially unexposed if it is desirable to operate the power tool without the guard member 40.

Various features of the invention are set forth in the following claims.

We claim:

1. A power tool comprising:
   a housing including a hub portion,
   a drive spindle extending outwardly from the hub portion, the drive spindle including an axis, and a tool receiving portion,
   a removable guard member mountable on the hub portion to cover at least a portion of a tool mounted on the tool receiving portion, the guard member being adjustable over a range of angular positions with respect to the hub portion, and
   means for securing the guard member on the hub portion so that the guard member is rotatable relative to the hub portion, the means for securing the guard member on the hub portion including a pair of axially spaced apart annular grooves on the hub portion.

2. A power tool as set forth in claim 1 wherein the hub portion includes a plurality of detents, each of the detents corresponding to a selected angular position of the guard member with respect to the hub portion, and wherein the guard member includes a manually operable locking member mounted thereon such that when the guard member is removed from the hub portion the locking member is also removed therefrom, the locking member being engagable with the detents to lock the guard member in selected angular positions.

3. A power tool as set forth in claim 2 wherein the locking member is a spring member, the spring member including a locking portion engageable with each of the detents, and a lever portion engageable by an operator to withdraw the locking portion from the detents.

4. A power tool as set forth in claim 1 wherein the guard member includes an annular base, the base encircling the spindle when the guard member is mounted on the hub portion, and wherein the power tool includes means for installing the guard member on the hub portion, the means for installing the guard member on the hub portion including a first set of projections on the base, and a second set of projections on the base, each of the projections in the first and second sets of projections extending radially inwardly from the base, the first set of projections being spaced from the second set of projections in an axial direction, and the first set of projections being receivable in the first annular groove, and the second set of projections being receivable in the second annular groove to prevent removal of the guard member from the hub portion.

5. A power tool as set forth in claim 4 wherein the hub portion includes an end face, the spindle extending outwardly from the end face, wherein the projections in the first set of projections are circumferentially non-equidistantly spaced apart, wherein the second set of projections is circumferentially aligned with the first set of projections, and wherein the means for installing the guard member on the hub portion includes a plurality of axially extending grooves in the hub portion, the axially extending grooves being circumferentially spaced apart on the hub portion to match the first and second sets of projections so that the first and second sets of projections are alignable with the axially extending grooves, and the axially extending grooves extending from the end face to the first and second annular grooves.

6. A power tool comprising:
   a housing including a plurality of detents,
   a drive spindle supported in the housing, the drive spindle extending outwardly from the housing, and the drive spindle including a tool receiving portion,
   a removable guard member mountable on the housing to cover at least a portion of a tool mounted on the tool receiving portion, the guard member being angularly adjustable over a range of angular positions with respect to the housing, and
   a manually operable locking member mounted on the guard member so that when the guard member is removed from the housing the locking member is also removed therefrom, the locking member being engagable with the detents to lock the guard member in selected angular positions.

7. A power tool as set forth in claim 6 wherein the locking member is a spring member, the spring member including a locking portion engageable with the detents, and a lever portion engagable by an operator to withdraw the locking portion from one of the detents.

8. A power tool as set forth in claim 7 wherein the housing includes a hub portion, the hub portion having an end face, the spindle extending outwardly from the end face, and the spindle including an axis, wherein the guard member includes an annular base, the base encircling the spindle when the guard member is mounted on the housing, and wherein the power tool includes means for securing the guard member on the hub portion, the means for securing the guard member on the hub portion including a first set of projections extending radially inwardly from the base, a first annular groove in the hub portion, and axially extending grooves in the hub portion corresponding to the first set of projections, the axially extending grooves extending between the end face and the first annular groove so that the guard member is mountable on the housing by aligning the first set of projections with the axially extending grooves, sliding the base along the hub portion until the first set of projections engage the first annular groove, and then angularly shifting the guard member relative to the hub to misalign the first set of projections with respect to the axially extending grooves.

9. A power tool as set forth in claim 8 wherein the means for securing the guard member on the hub portion includes a second set of projections on the base, the second set of projections being circumferentially aligned with the first set of projections and axially spaced therefrom, and a second annular groove in the base portion, the second annular groove being axially spaced from the first annular groove, and the second annular groove receiving the second set of projections when the guard member is mounted on the housing.

10. A power tool as set forth in claim 8 wherein the first set of projections includes a plurality of circumferentially non-equidistantly spaced projections so that the guard member must have a predetermined angular orientation relative to the hub portion for the first set of projections to align with the axially extending grooves.

11. A power tool comprising:

a housing including a hub portion, the hub portion including a plurality of detents, a spindle supported in the housing, the spindle being adapted to have a work tool mounted thereon, a removable guard member for the work tool, the guard member being mountable on the hub portion, the guard member being angularly adjustable relative to the hub portion over a range of operative positions defined by the plurality of detents, and a locking member fixed on the guard member as a part thereof so that when the guard member is removed from the hub portion the locking member is removed therewith, the locking member being engageable with the detents when the guard member is mounted on the hub portion to secure the guard member in a selected one of its operative positions.

12. A power tool as set forth in claim 11 wherein the locking member is a spring member, the spring member including a locking portion engageable with the detents, and a lever portion engagable by an operator to withdraw the locking portion from one of the detents.

13. A power tool as set forth in claim 11 wherein the spindle includes an axis, and wherein the power tool includes means for securing the guard member on the hub portion so that the guard member is rotatable relative to the hub portion, the means for securing the guard member on the hub portion including a pair of axially spaced apart annular grooves on the hub portion.

14. A power tool as set forth in claim 13 wherein the spindle extends outwardly from the hub portion, wherein the guard member includes an annular base, the base encircling the spindle when the guard member is mounted on the hub portion, and wherein the means for securing the guard member on the hub portion includes means for installing the guard member on the hub portion so that the guard member must be in a selected angular position outside of the range of operative positions to initially mount the guard member on the hub, the means for installing the guard member on the hub portion including a first set of projections on the base, and a second set of projections on the base, each of the projections in the first and second sets of projections extending radially inwardly from the hub portion, the first set of projections being spaced from the second set of projections in an axial direction, and the first set of projections being receivable in the first annular groove and the second set of projections being receivable in the second annular groove to prevent removal of the guard member from the hub portion.

15. A power tool as set forth in claim 14 wherein the hub portion includes an end face, the spindle extending outwardly from the end face, wherein the first set of projections is circumferentially aligned with the second set of projections, and wherein the means for installing the guard member on the hub portion includes a plurality of axially extending grooves in the hub portion, the axially extending grooves being circumferentially spaced apart on the hub portion to match the first and second sets of projections so that the first and second sets of projections are alignable with the axially extending grooves, and the axially extending grooves extending from the end face to the first and second annular grooves.

16. A power tool as set forth in claim 15 wherein the projections in the first set of projections are circumferentially non-equidistantly spaced apart.

* * * * *